United States Patent
Finkbeiner et al.

(10) Patent No.: US 7,509,887 B2
(45) Date of Patent: Mar. 31, 2009

(54) STEERING COLUMN ASSEMBLY HAVING SINGLE LEVER TILT AND TELESCOPE ADJUSTMENT

(75) Inventors: Steven P. Finkbeiner, Essexville, MI (US); Robert D. Maida, Pinconning, MI (US)

(73) Assignee: Delphi Technologies, Inc., Troy, MI (US)

( * ) Notice: Subject to any disclaimer, the term of this patent is extended or adjusted under 35 U.S.C. 154(b) by 802 days.

(21) Appl. No.: 10/961,558

(22) Filed: Oct. 8, 2004

(65) Prior Publication Data

US 2005/0183534 A1 Aug. 25, 2005

Related U.S. Application Data

(60) Provisional application No. 60/510,319, filed on Oct. 10, 2003.

(51) Int. Cl.
*B62D 1/18* (2006.01)
(52) U.S. Cl. .................... 74/493; 280/775; 280/777
(58) Field of Classification Search ............ 74/492, 74/493; 280/775, 777
See application file for complete search history.

(56) References Cited

U.S. PATENT DOCUMENTS

| | | | |
|---|---|---|---|
| 6,623,036 B2* | 9/2003 | Yamamura et al. | 280/775 |
| 7,281,448 B2* | 10/2007 | Li et al. | 74/493 |
| 2002/0089161 A1* | 7/2002 | Yamamura et al. | 280/777 |
| 2005/0258627 A1* | 11/2005 | Sadakata et al. | 280/775 |

* cited by examiner

*Primary Examiner*—David M Fenstermacher
(74) *Attorney, Agent, or Firm*—Thomas N. Twomey (57) ABSTRACT

An apparatus includes a steering column assembly defining a longitudinal axis that is adjustable along at least one of a tilting and telescoping path of adjustment. The apparatus also includes a locking device associated with the steering column assembly to selectively lock and unlock steering column with respect to the at least one of tilting and telescoping paths of adjustment. The locking device includes a lever arm mounted to the steering column assembly for rotation about a rotation axis. The lever arm includes a cam surface. The locking device also includes a lock member having a cam follower surface engaged with the cam surface to move between locked and unlocked positions in response to rotation of the lever arm. The lock member is spaced from the rotation axis along the longitudinal axis.

18 Claims, 13 Drawing Sheets

STEERING COLUMN ASSEMBLY HAVING SINGLE LEVER TILT AND TELESCOPE ADJUSTMENT

CROSS REFERENCE TO RELATED APPLICATIONS

This application claims the benefit of U.S. provisional patent application Ser. No. 60/510,319 for a STEERING COLUMN ASSEMBLY HAVING SINGLE LEVER TILT AND TELESCOPE ADJUSTMENT, filed on Oct. 10, 2003, which is hereby incorporated by reference in its entirety. This claim is made under 35 U.S.C. § 119(e); 37 C.F.R. § 1.78; and 65 Fed. Reg. 50093.

FIELD OF THE INVENTION

The invention relate to a steering column for a vehicle and more particularly to a locking device for a steering column to selectively prevent movement of the steering column along at least one of a tilting path of movement and a telescoping path of movement.

BACKGROUND OF THE INVENTION

Vehicles can be equipped with steering columns that adjust the position of the steering wheel to enhance the comfort and safety of the driver. For example, the steering column can telescope to move closer to and away from the driver. Also, the position of the steering wheel can be tilted relative to the driver. These features together enable the driver to adjust the steering wheel to a desired, convenient position for operating the vehicle, and for enabling the wheel to be moved out of the way to provide greater access to getting into and out of the driver's seat of the vehicle.

SUMMARY OF THE INVENTION AND ADVANTAGES

The invention provides an apparatus including a steering column assembly defining a longitudinal axis. The steering column assembly is adjustable along at least one of tilting and telescoping paths of adjustment. The apparatus also includes a locking device associated with the steering column assembly to selectively lock and unlock steering column with respect to the at least one of tilting and telescoping paths of adjustment. The locking device includes a lever arm mounted to the steering column assembly for rotation about a rotation axis. The lever arm includes a cam surface. The locking device also includes a lock member having a cam follower surface engaged with the cam surface to move between locked and unlocked positions in response to rotation of the lever arm. The lock member is spaced from the rotation axis along the longitudinal axis.

In the exemplary embodiment of the invention which is provided for illustrative purposes only, the steering column assembly includes a second lock to control movement along the other of tilting and telescoping paths of movement. Both the locking device and the second lock are controlled by the lever arm. As result, the complexity of the steering column locking system is reduced.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

The invention provides and apparatus 8 including a steering column assembly, such as the tilt and telescope steering column assembly constructed according to a presently preferred embodiment of the invention shown generally at 10 in the drawings. The steering column assembly 10 includes a longitudinal axis 11 and is adjustable along a tilting path 13 and a telescoping path 15. It includes an outer column jacket or third member 12 and an inner column jacket or first member 14 which is selectively slidable within the outer jacket 12 to provide telescopic adjustment of the inner jacket 14 relative to the stationary outer jacket 12, and further which is selectively tiltable to enable angular adjustment of the inner jacket 14 relative to the outer jacket 12. According to a particular feature of the invention, both the tilt and telescope adjustments of the column assembly 10 are controlled by a single, common control lever 16.

The outer jacket 12 has a generally tubular jacket body 18 defining a longitudinally extending inner passage 20 that is open at an upper steering end 22 of the outer jacket 12. The inner jacket 14 includes a main body 24 that is received within the passage 20 of the outer jacket and which extends telescopically there along during telescopic adjustment of the column assembly 10. The inner jacket 14 is engaged with a tilt head or second member 26 that is mounted by a pivot connection 28, second rotation axis C, adjacent an upper end 30 of the inner jacket main body 24. A steering mechanism, such as a steering shaft 29 and a hand wheel (not shown) mounted at one end of the shaft extends through an opening 32 in the tilt head and through a hollow passage 34 in the inner jacket main body 24, and thus the passage 20 of the outer jacket 12 where it is operatively coupled at its opposite end to steer the wheels of a vehicle. Such a shaft is jointed in the vicinity of the pivot connection 28 and operatively mounted on the tilt head 26 for rotation to effect steering of the vehicle as well as tilting with the tilt head 26 to effect tilt adjustment of the column assembly 10 and steering mechanism (not shown).

The column assembly 10 includes a tilt lock mechanism or locking device 36 as well a telescope lock mechanism or second lock 38. Operation of both mechanisms 36, 38 is controlled by the single control lever 16.

The telescope lock mechanism or second lock 38 includes a wedge lock shoe 40 disposed between the outer jacket 12 and the inner jacket 14 and is operative, when actuated, to force the inner jacket 14 into tight frictional engagement with the outer jacket 12 to preclude relative telescoping movement of the jackets 12, 14 when locked, and further operative in an unlocked condition to enable free telescoping movement of the inner jacket 14 relative to the outer jacket 12. The wedge lock shoe 40 has a generally triangular cross-section and extends transverse to the jackets 12, 14. The shoe 40 can be retracted out of the pocket during assembly of the jackets 12, 14 with respect to one another. The shoe 40 moves in the pocket in a direction transverse and preferably perpendicular to the longitudinal axis of the inner jacket 14 into and out of the locking position.

The portion of the pocket 42 defined by the inner jacket 14 is oversized in the direction of telescoping movement. The shoe 40 includes sides defining first and second stop surfaces 41, 141 which cooperate with axially spaced stop surfaces 43, 45 on the inner jacket 14 which confront the surfaces 41, 141, respectively, of the shoe 40 to limit the travel of telescopic adjustment in both directions. In other words, stop surface 45 of the inner column jacket 14 confronts stop surface 141 of the shoe 40 to define an inner-most telescopic position of the inner jacket 14, and the stop surface 43 of the inner jacket 14 is positioned to confront the stop surface 41 of the shoe 40 to define an outer-most telescopic position of the inner jacket 14. The shoe 40 thus captures the inner jacket 14 within the outer jacket 12 and limits its travel.

The wedge lock shoe 40 is coupled with an actuator pin 44 that is slidable within a transverse bore 46 of the outer jacket assembly 12. The actuator pin 44 is connected at its inner end to the wedge lock shoe 40, and projects outwardly therefrom beyond the outer jacket 12 and through an opening 48 in the lever 16. As shown in the drawings, the connection between the actuator pin 44 and wedge lock shoe 40 is preferably one in which the parts are connected, yet separable from one another for servicing and/or replacement of one or the other parts. Preferably, the wedge lock shoe 40 is fabricated of sintered powder metal material, such as a steel powder composition to enable the generally triangular or prism-like shoe 40 to be made in a cost-effective manner. The shoe 40 is formed with a keyhole slot 50, forming a pocket 52 in the shoe 40 to receive a head 54 of the pin 44 into the pocket 52, and a reduced neck 56 of the pin 44 into the slot 50 in order to secure the wedge-lock shoe 40 in the axial direction of the pin 44 for conjoint movement along the axis A while allowing the pin 44 to rotate relative to the shoe 40.

The axially outer free end of the actuator pin 44 is threadably received in a nut 58. The nut 58, in turn, is tightened against the control lever 16 to effectively fix the actuator pin 44 to the control lever 16 so that the control lever and pin rotate together as one structure about the axis A of the pin 44. The bore 46 of the outer jacket assembly 12 is threaded along its length. The actuator pin 44 has external threads formed on a central threaded region 60 of the pin 44 in engagement with the internal threads of the bore 46. In this way, rotation of the control lever 16, and thus rotation of the actuator pin 44, about the axis A has the effect of displacing the actuator pin 44 and thus the wedge lock shoe 40 along the axis A toward or away from the inner jacket 14 and thus into and out of the clamped position. The configuration of the key hole slot 50, pocket 52, and the head 54 and neck 56 of the wedge lock shoe and actuator pin enable the pin 44 to rotate relative to the wedge lock shoe 40 while achieving the axial displacement of the shoe and pin. It will thus be appreciated that the telescope lock mechanism operates by simply rotating the control lever 16 in one direction to move the pin 44 and thus the wedge lock shoe 40 outwardly to release wedge lock clamping bores on the inner jacket 14 and permit telescoping adjustment of the inner jacket relative to the outer jacket 12 to any desired position of adjustment, and thereafter to rotate the lever in the opposite direction to displace the pin 44 and thus the shoe 40 inwardly along the axis A causing the shoe 40 to wedge tightly between the outer and inner jackets 12, 14. In this regard, it will be seen from the drawings that the inner jacket 14 is formed in the area of the wedge lock shoe 40 with a ramped surface that forms an angle with a floor of the inner passage 20 complementing the angle of the wedge lock shoe 40, and causing the inner jacket 14 to be wedged in a direction perpendicular to the ramped surface.

Turning now to the construction and operation of the tilt lock mechanism or locking device 36, it includes a tilt lock pin or lock member 64 received in a square bore 66 of the main body 24 of the inner jacket 14, and extending laterally outwardly through a slot 68 in the tilt head 26 of the inner jacket 14. The bore 66 is preferably a blind bore and accommodates a spring 70 which acts to constantly bias the tilt lock pin 64 axially outwardly along an axis B of the tilt lock pin 64. The axis or linear path B of the tilt lock pin 64 is spaced from the rotation axis A of the wedge lock actuator pin 44, and preferably beyond the upper end 22 of the outer jacket 12. The axis B is further spaced from a pivot axis C of the pivot connection 28 about which the tilt head 26 pivots relative to the main body 24 of the inner jacket 14. Preferably, the axis B is located between the axes A and C.

The tilt head 26 preferably includes a set of pivot arms 72 which straddle opposing side walls of the main body 24 and mount pivot pins 73 which establish the pivot connection 20 between the tilt head 26 and main body 24. One of the external pivot arms 72 on the side of the tilt lock pin 64 extends beyond the pivot connection 28 and is formed adjacent its free end with the slot 68 through which the tilt lock pin 64 projects. The walls of the slot 68 are preferably smooth and generally uniform in width along the slot, which preferably has an arcuate or kidney-shaped outline following the curvature of the arc along which it lies relative to the pivot axis C. In this way, the tilt head 26 is free to pivot relative to the tilt lock pin 64 without interference from the walls of the slot.

A set of teeth 74 are formed in the slot 68. Preferably a set of opposing locking teeth 74 are formed in the slot 68 and dimensioned relative to a square locking portion 76 of the tilt lock pin 64 to lock the teeth 74 in engagement with the sharp edges of the square locking portion 76 when the tilt lock mechanism is in a locked condition so as to secure the tilt head 26 against tilting movement relative to the main body 24 and outer jacket 12. The tilt lock pin 64 is formed with a reduced neck portion 78 adjacent the square locking portion 76 which, when the tilt lock pin 64 is displaced inwardly into the bore 66 against the return force of the spring 70, causes the locking portion 76 of the pin 64 to move out of locking engagement with the locking teeth 74 and bringing the reduced neck portion 78 into position between the teeth 74. The reduced neck portion 78 is sized so that, when in position between the teeth 74, it is maintained out of engagement with the teeth 74 thereby establishing an unlocked condition of the tilt lock mechanism 36 enabling the tilt head 26 to tilt relative to the main body 24 of the inner jacket 14.

According to one aspect of the invention, the single control lever 16 which is used to control operation of the telescope lock mechanism 38 is also used to control the positioning of the tilt lock pin 64 and thus control operation of the tilt lock mechanism 36. As shown in the drawings, the control lever 16 has a contoured inner reaction or cam surfaces 80, 86, 88, 90, 92, 94 across which a cam follower surface free end 82 of the tilt lock pin 64 rides during rotation of the control lever 16 between various positions about the rotation axis A of the lever 16. The positions of the lever used to control the locking and unlocking of the tilt lock mechanism 36 are coordinated with the positions of the lever used for locking and unlocking the telescope lock mechanism for controlled adjustment of the tilt and telescope positions of the column. In a first position shown in FIG. 1 of the tilt and telescope lock mechanisms are locked. In this position, the lever is rotated to locate the wedge lock shoe 40 in the clamped position to preclude telescopic movement of the inner jacket 14 relative to the outer jacket 12, and the free end 82 is positioned against a first portion 84 of the reaction surface 80 which enables the tilt lock pin 64 to be urged outwardly by the spring 70 to locate the locking portion 78 in locking engagement with the locking teeth 74 of the pivot arm, thereby also precluding tilting movement of the tilt head 26.

Figure 1:
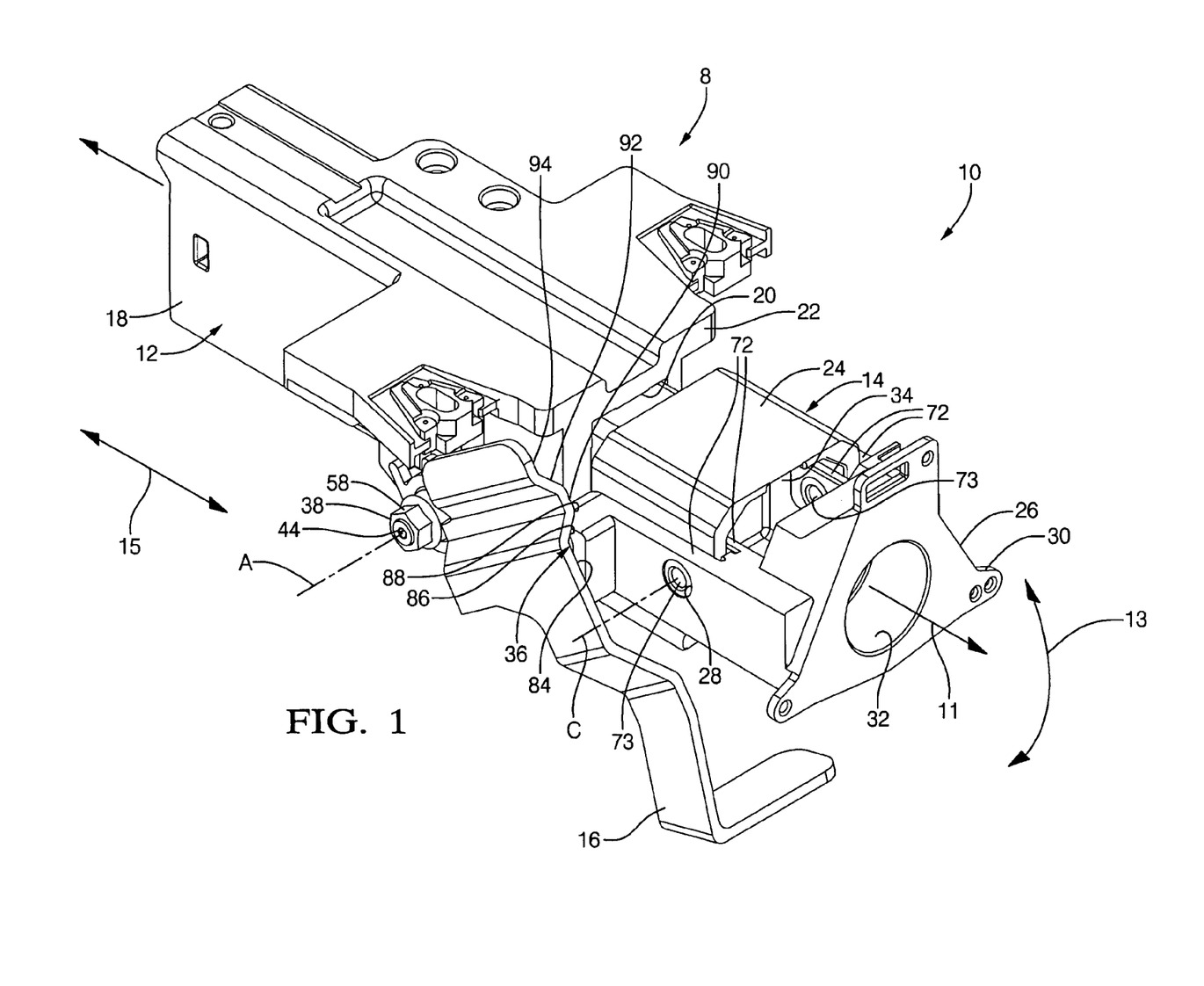
FIG. 1 is a perspective view of the exemplary embodiment of the invention showing the relative positions between a lever arm and a steering column when tilt and telescoping locks are in respective locked positions.
Figure 2:
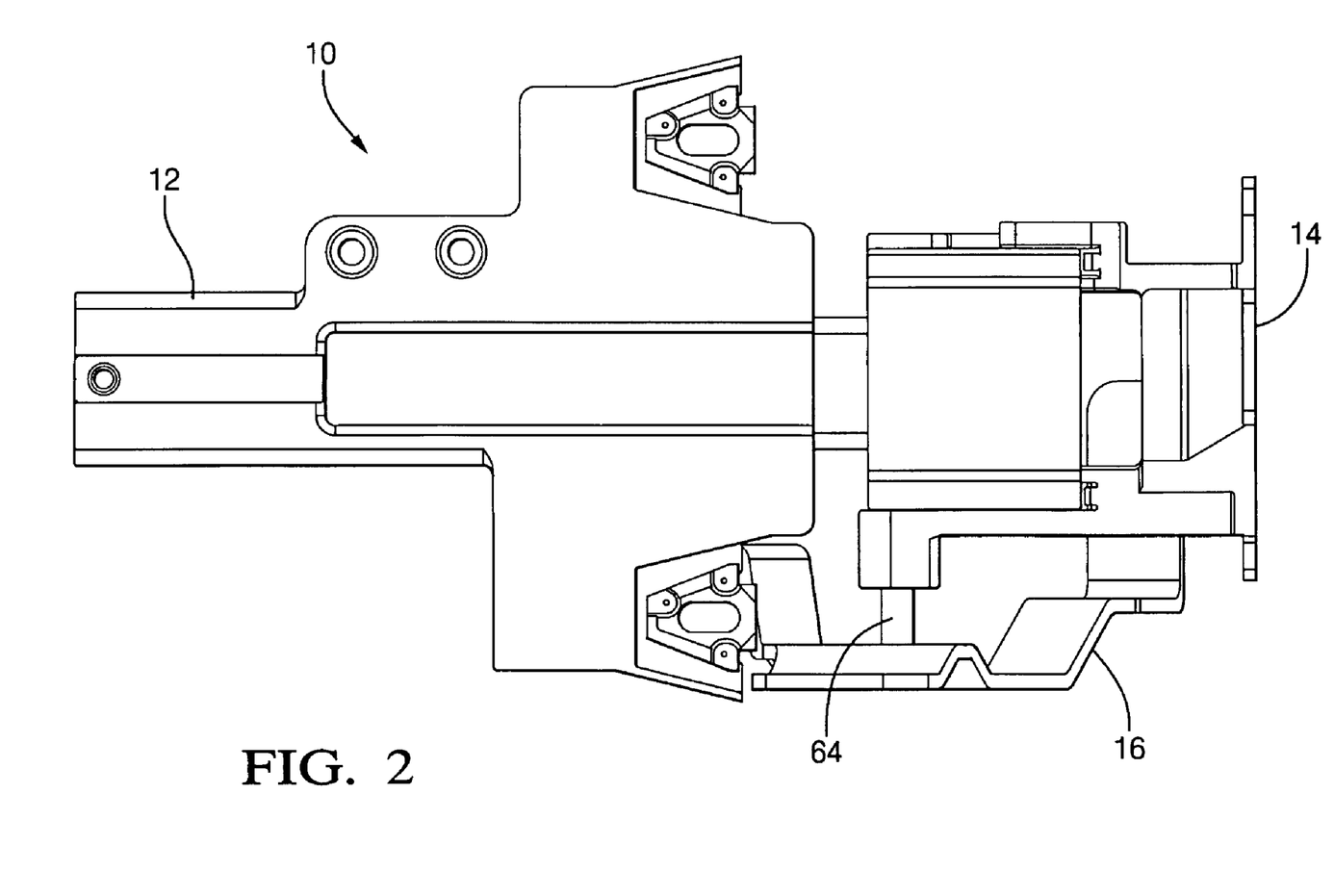
FIG. 2 is a top view of the exemplary embodiment of the invention shown in FIG. 1.
Figures 3, 3A:
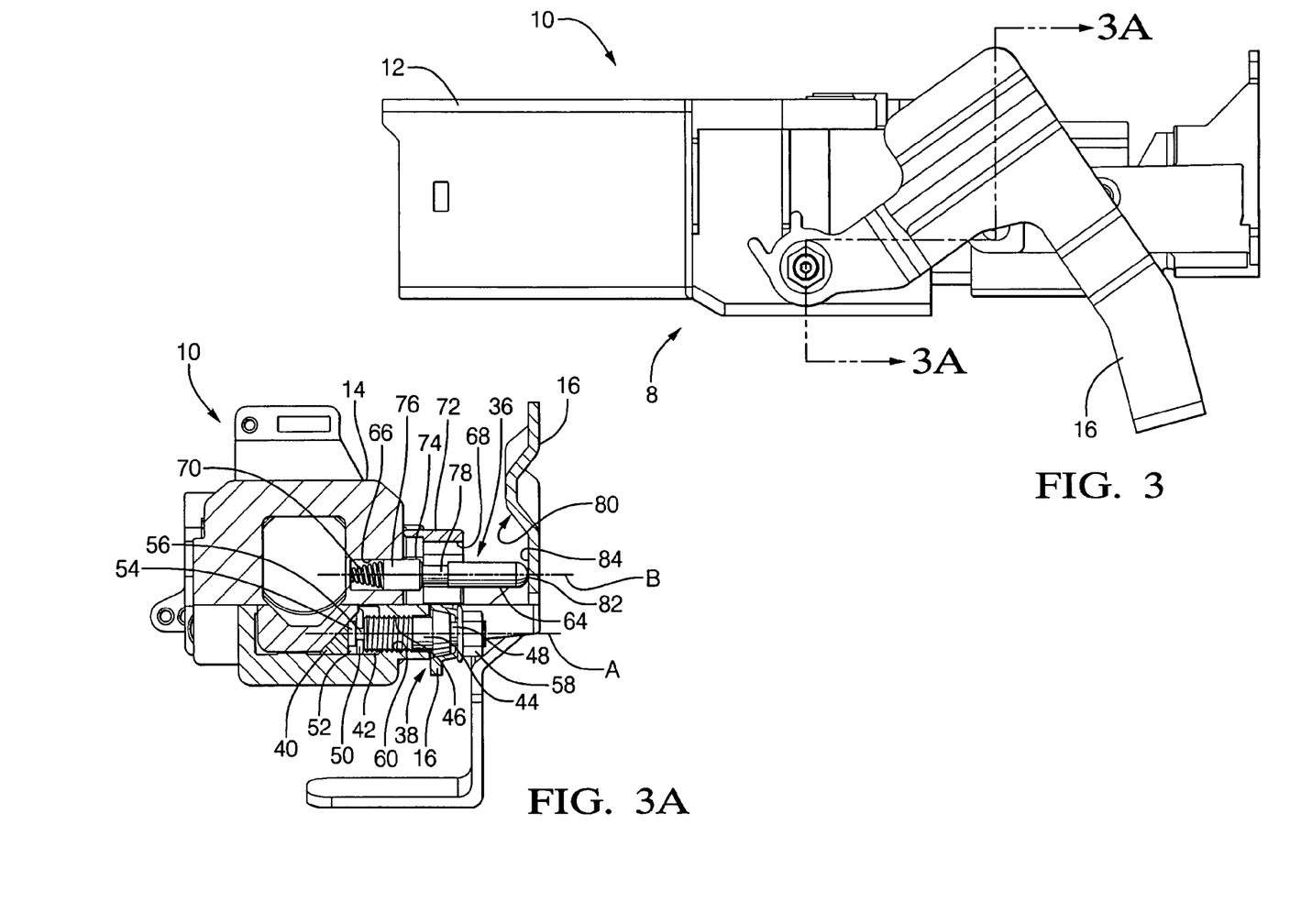
FIG. 3 is a front view of the exemplary embodiment of the invention shown in FIGS. 1 and 2.
FIG. 3A is a cross-sectional view taken along section lines 3A-3A in FIG. 3.
Figure 4:
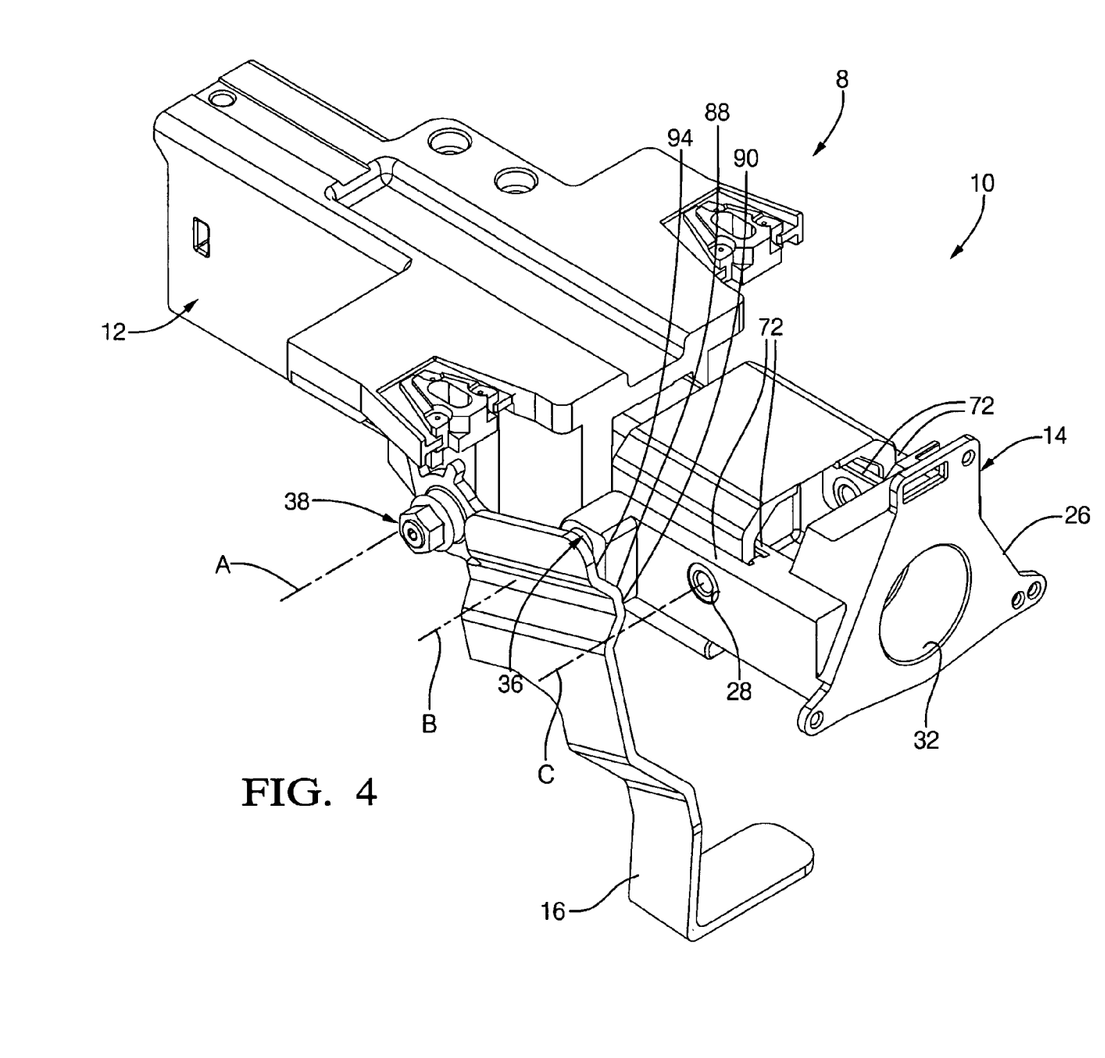
FIG. 4 is a perspective view of the exemplary embodiment of the invention showing the relative positions between a lever arm and a steering column when the tilt lock is in the unlocked position and the telescoping lock is in the locked position.
Figures 5, 6:
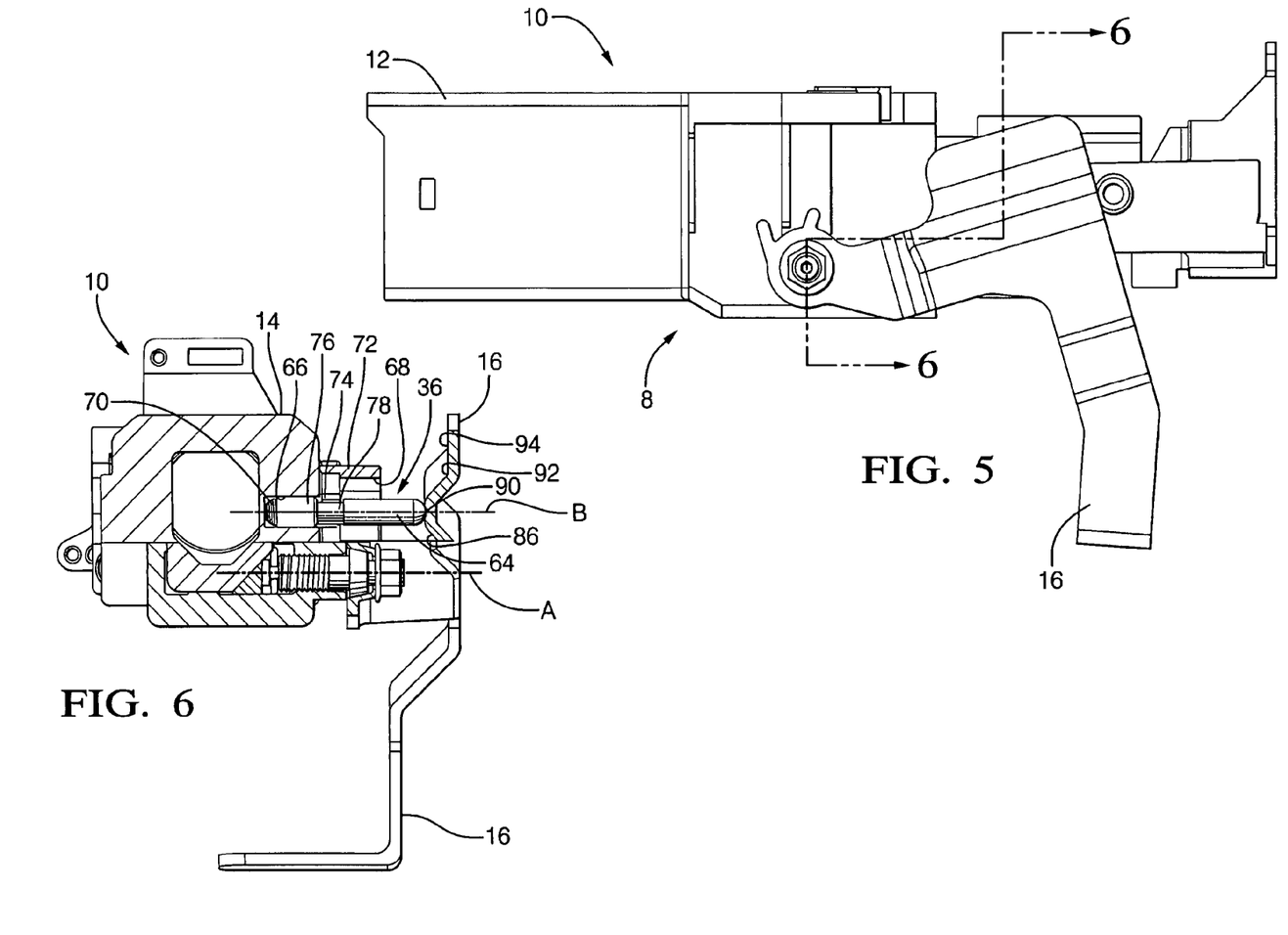
FIG. 5 is a front view of the exemplary embodiment of the invention shown in FIG. 4.
FIG. 6 is a cross-sectional view taken along section lines 6-6 in FIG. 5.
Figure 7:
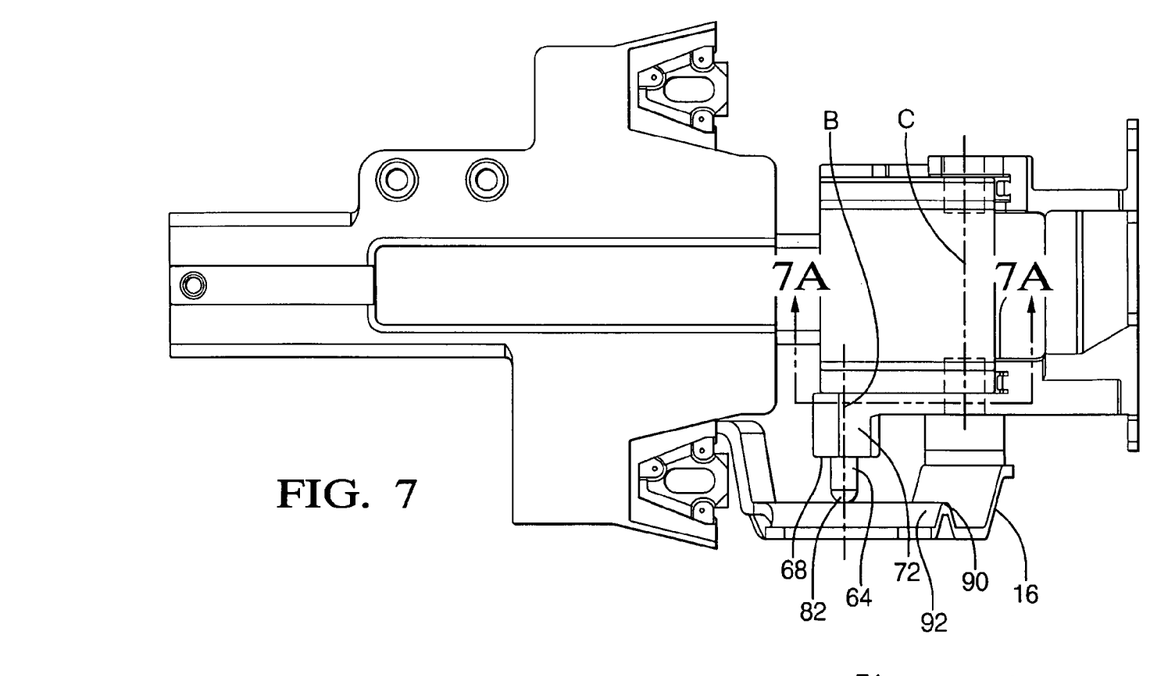
FIG. 7 is a partial top view of the exemplary embodiment of the invention shown in FIGS. 4-6.
Figure 7A:
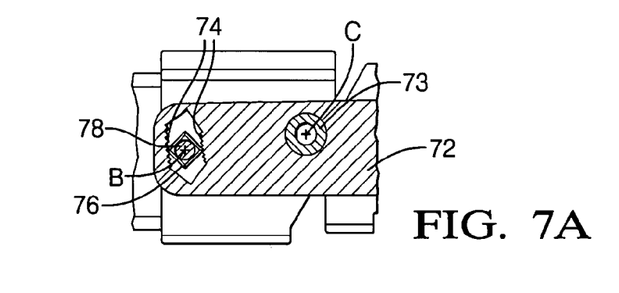
FIG. 7A is a cross-sectional view taken along section lines 7A-7A in FIG. 7.

Rotating the lever downwardly in a clockwise direction with respect to the view of FIG. 1 to the position of FIGS. 4 and 6 causes the free end 82 of the tilt lock end 64 to travel along a ramp or angled surface 86 of the control lever 16 to a second plateau region 88 spaced laterally inwardly of the first portion surface 84, displacing the tilt lock pin 64 deeper into the bore 66 and thereby moving the locking portion 76 of the pin 64 out of locking engagement with the locking teeth 74 and bringing the reduced neck portion 78 into position between the teeth so as to permit tilting movement of the tilt head 26. Preferably, a detent 90 is formed in the plateau region 88 to provide the user with a positive feel for when the lever is moved to the tilt adjust position. When in the tilt adjust position, the wedge lock shoe 44 preferably remains in the clamped condition to prevent telescopic movement.

Figure 8:
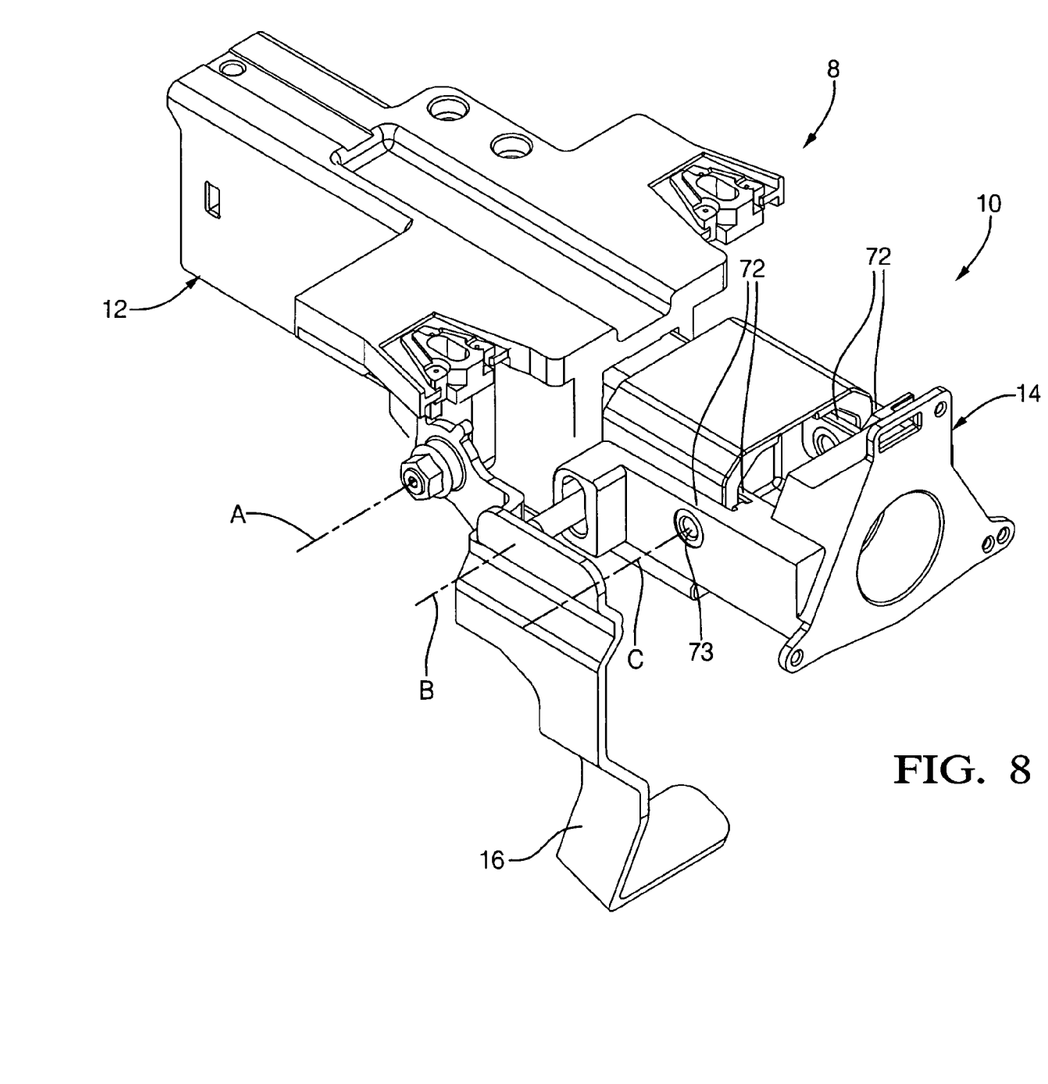
FIG. 8 is a perspective view of the exemplary embodiment of the invention showing the relative positions between a lever arm and a steering column when the tilt lock is in the locked position and the telescoping lock is in the unlocked position.
Figures 9, 10, 10A:
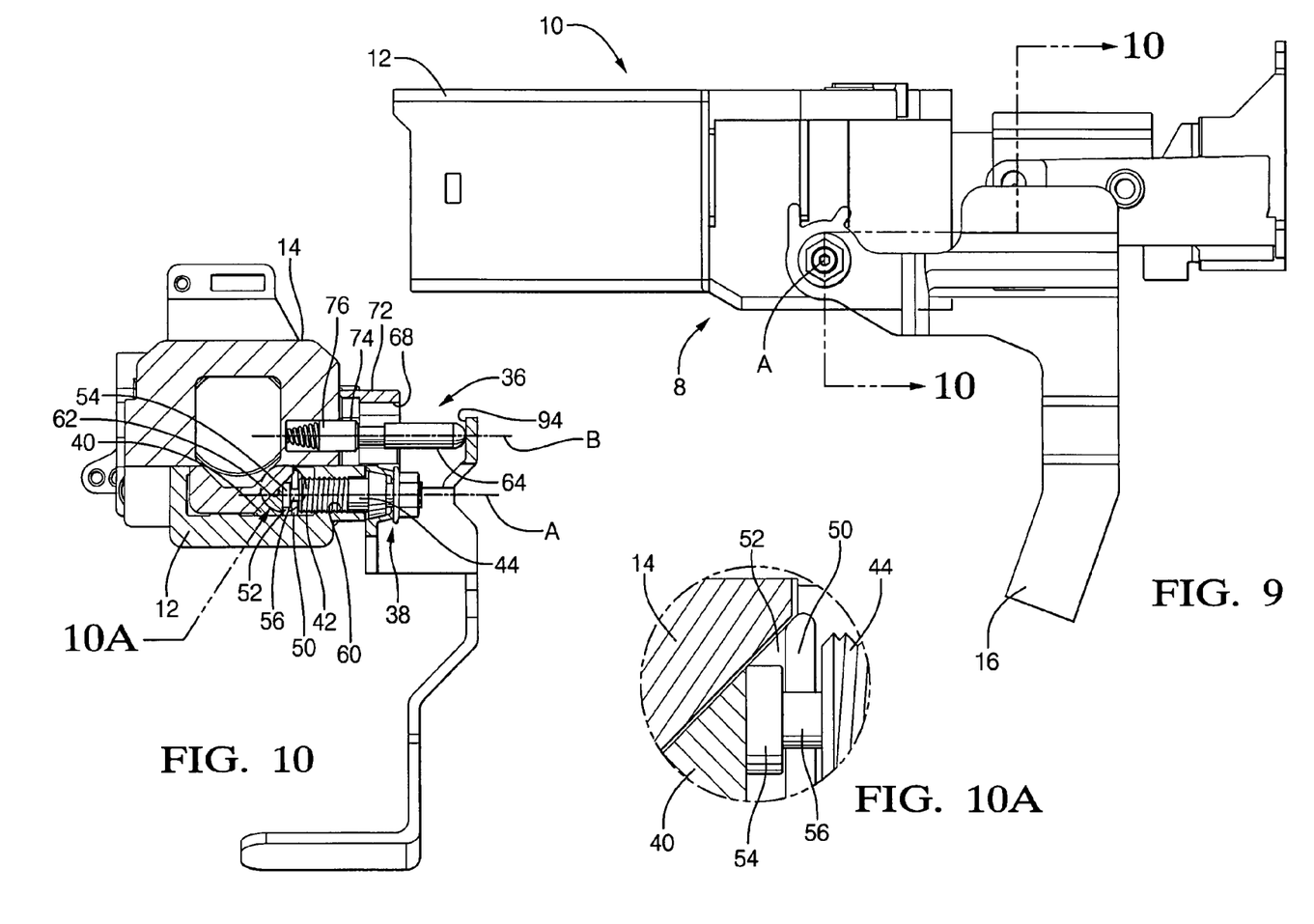
FIG. 9 is a front view of the exemplary embodiment of the invention shown in FIG. 8.
FIG. 10 is a cross-sectional view taken along section lines 10-10 in FIG. 9.
FIG. 10A is a detail view taken along detail circle 10A in FIG. 10.
Figures 11, 12:
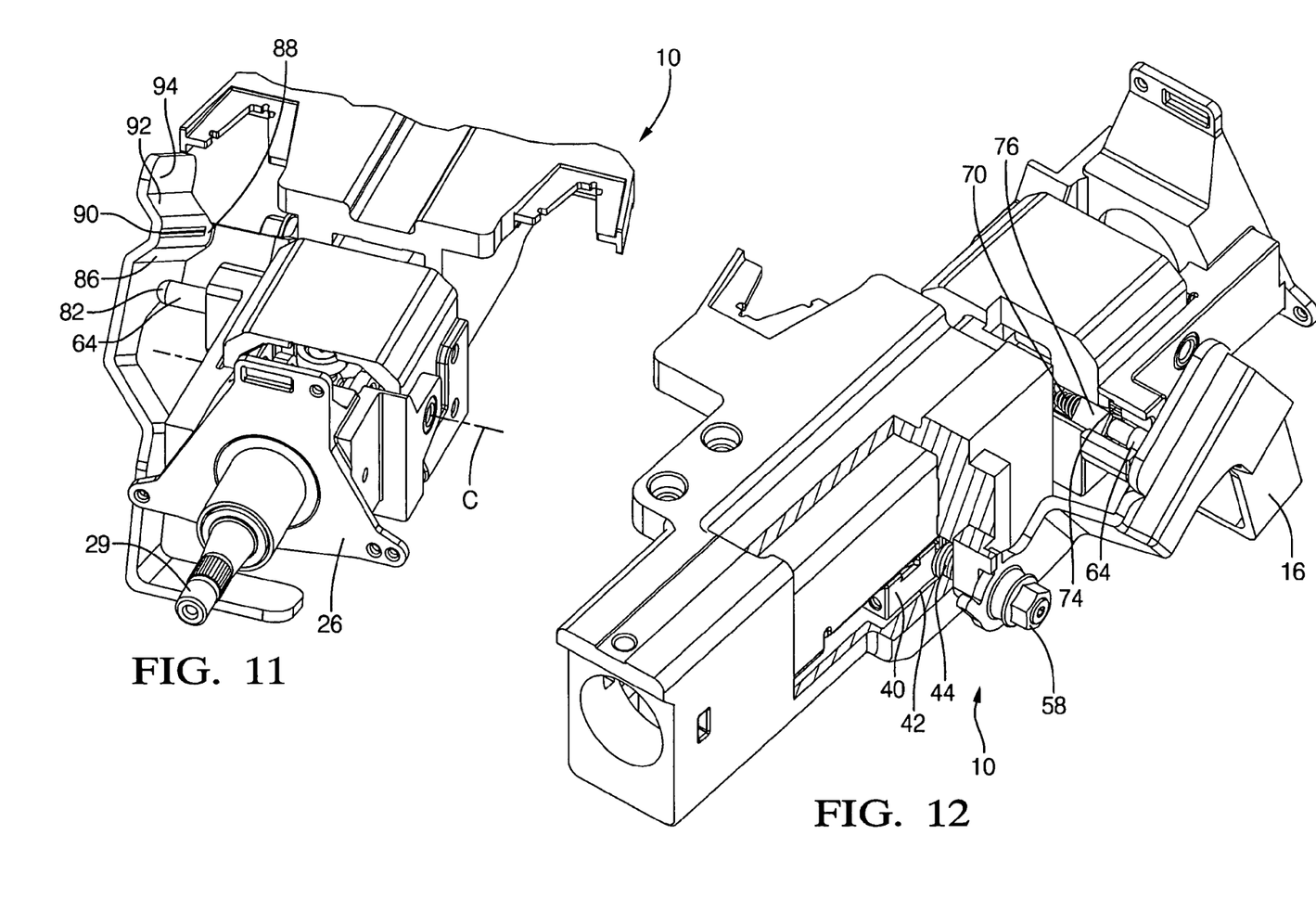
FIG. 11 is a partial perspective view of the exemplary embodiment of the invention showing the relative positions between a lever arm and a steering column when tilt and telescoping locks are in respective locked positions.
FIG. 12 is a perspective view with cut-outs to show portions of the tilt and telescope locks when tilt and telescoping locks are in respective locked positions.
Figure 13:
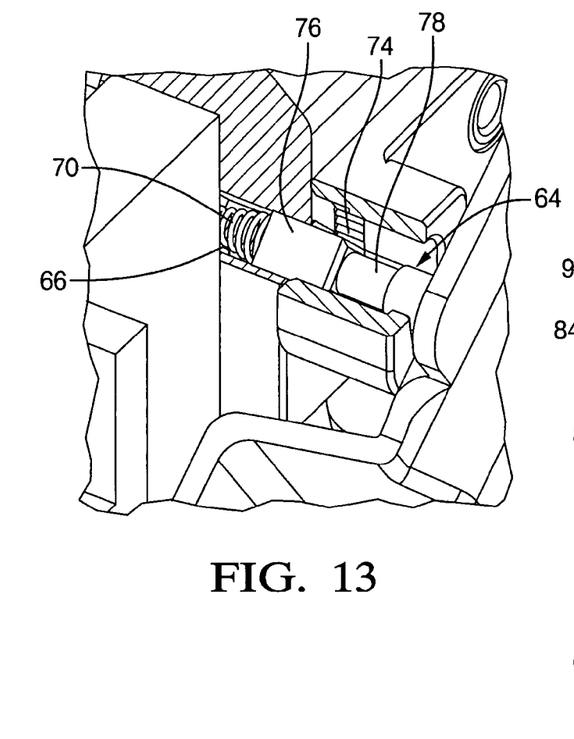
FIG. 13 is detail view of the tilt lock and corresponds to the view in FIG. 12.
Figure 14:
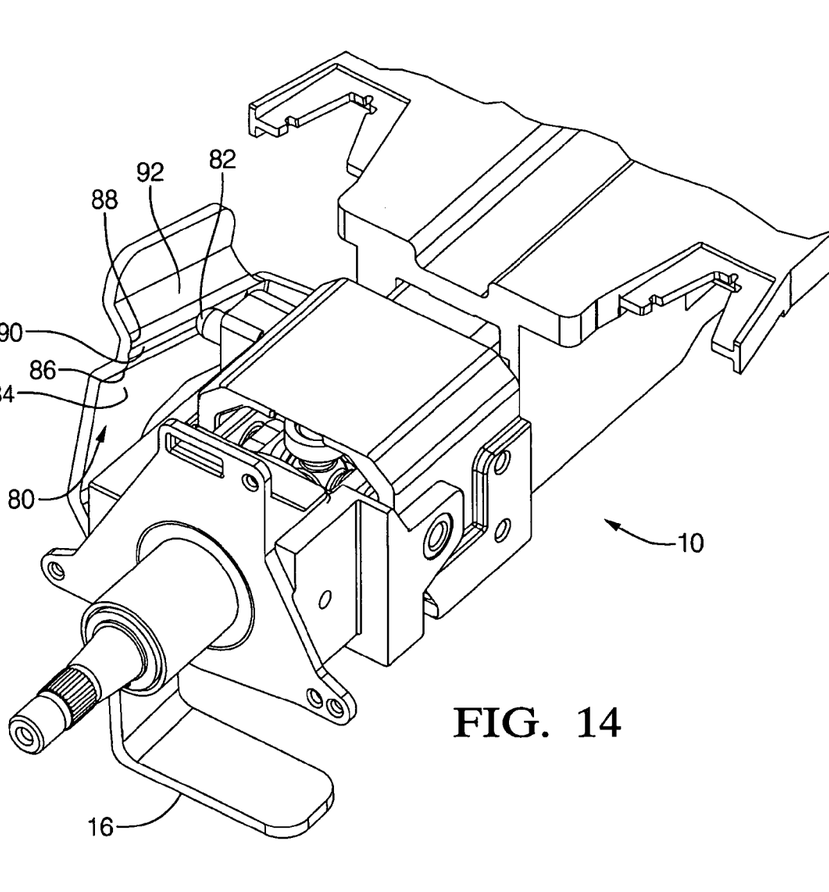
FIG. 14 is a partial perspective view of the exemplary embodiment of the invention showing the relative positions between a lever arm and a steering column when the tilt lock is in the unlocked position and the telescoping lock is in the locked position.
Figure 15:
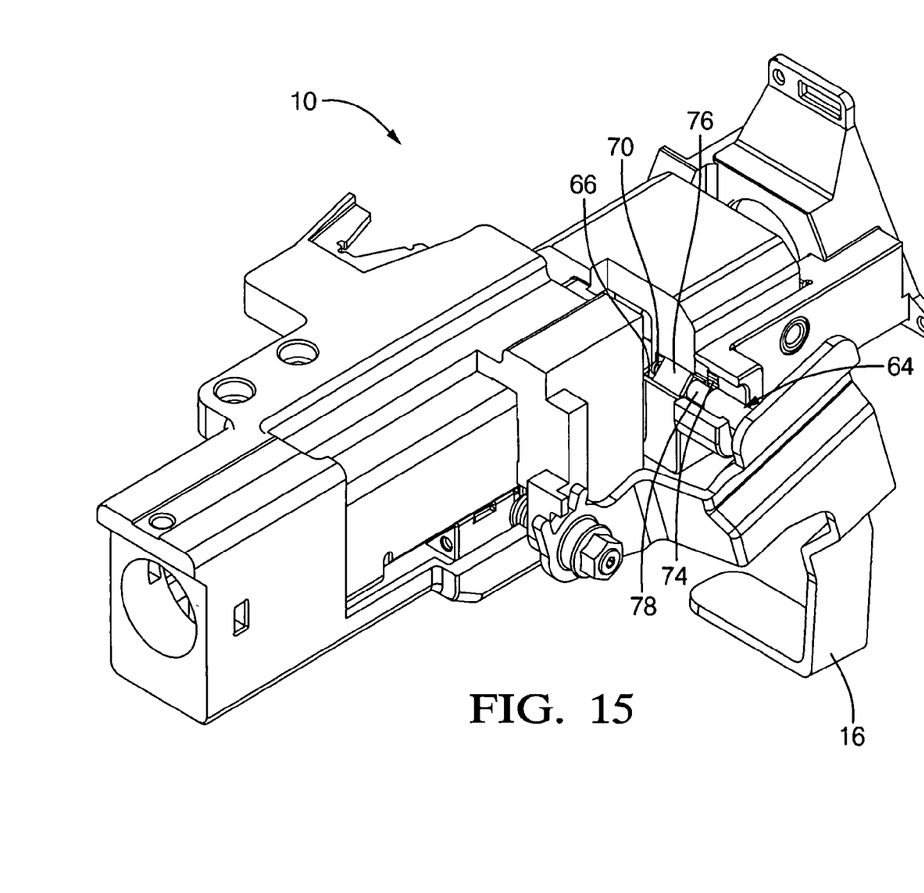
FIG. 15 is a perspective view with cut-outs to show portions of the tilt and telescope locks when the tilt lock is in the unlocked position and the telescoping lock is in the locked position.
Figure 16:
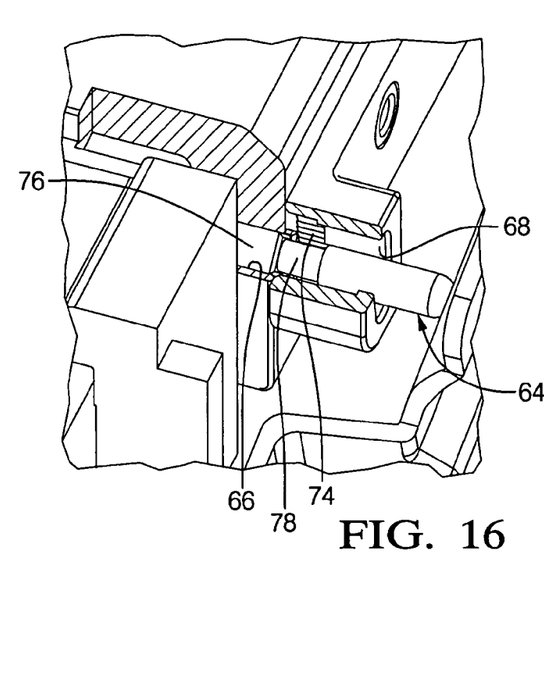
FIG. 16 is detail view of the tilt lock and corresponds to the view in FIG. 15.
Figures 17, 18:
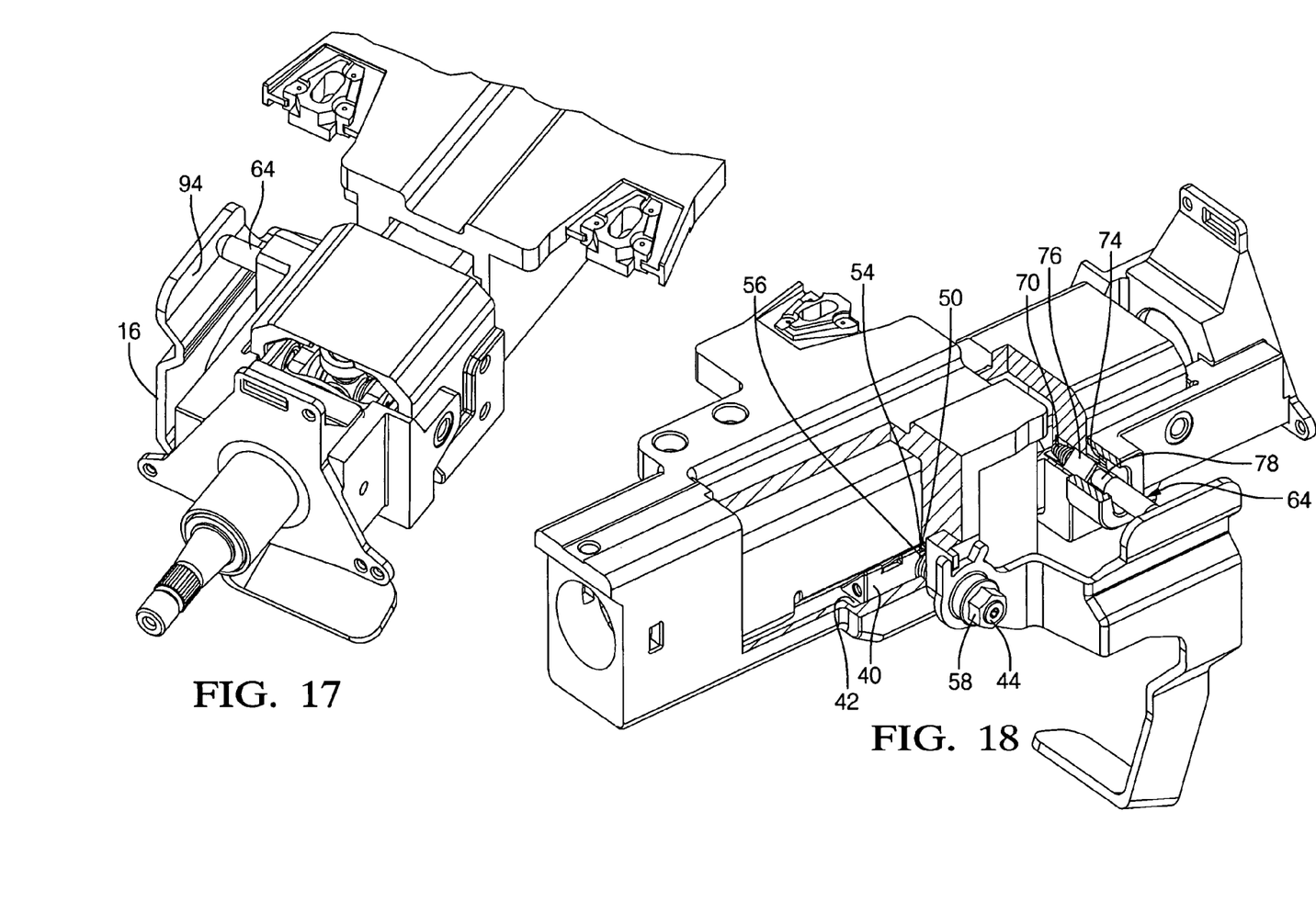
FIG. 17 is a perspective view of the exemplary embodiment of the invention showing the relative positions between a lever arm and a steering column when the tilt lock is in the locked position and the telescoping lock is in the unlocked position.
FIG. 18 is a perspective view with cut-outs to show portions of the tilt and telescope locks when the tilt lock is in the locked position and the telescoping lock is in the unlocked position.
Figure 19:
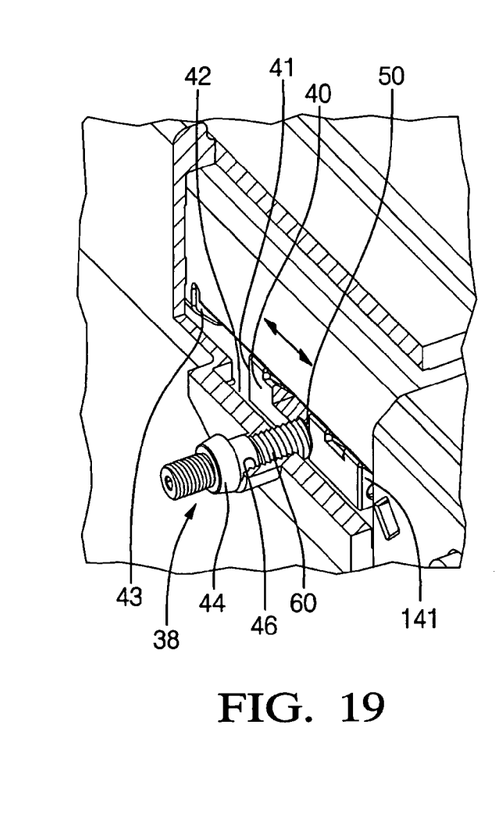
FIG. 19 is a detail view of the telescope lock and corresponds to FIG. 15.
Figure 20:
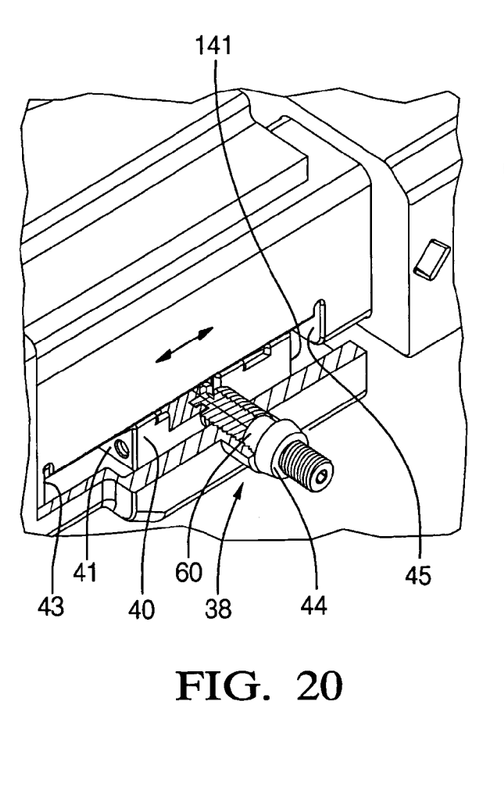
FIG. 20 is a detail view of the telescope lock and corresponds to FIG. 15.
Figure 21:
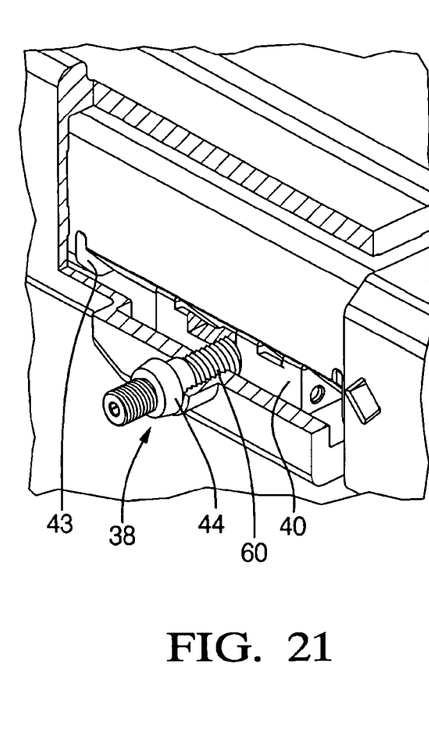
FIG. 21 is a detail view of the telescope lock and corresponds to FIG. 15.

Telescopic adjustment is achieved by rotating the lever 16 still further downwardly to the position shown in FIGS. 8 through 10. It will be seen that the free end 82 of the tilt lock pin 64 is caused to move along an outwardly angled surface 92 and to position against a third region 94 of the cam surface 80 which causes the tilt lock pin 64 to return outwardly under the force of the spring 70 to the locked condition to again prevent tilting movement of the tilt head 26. This position of the lever 16, however, has the effect of rotating the actuator pin 44 sufficiently to advance the actuator pin 44 and thus the wedge lock shoe 40 outwardly along the axis A to release the wedge lock shoe 40 from clamping engagement with the inner jacket 14, permitting telescopic adjustment of the inner jacket 14 relative to the outer jacket 12. Once the desired telescopic adjustment is made, the user, while supporting the steering wheel or other hand control in the desired tilt and telescope adjustment positions, returns the lever 16 upwardly to its initial locked condition to secure the column in the desired tilt and telescope adjusted positions.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus (8) comprising:
   a steering column assembly (10) defining a longitudinal axis (11) and adjustable along a tilting path (13) of adjustment;
   said steering column assembly (10) including a first member (14) defining a bore (66) and a second member (26) pivotably engaged with said first member (14) about a second rotational axis (C), with said second member (26) defining a slot (68) aligned with said bore (66) throughout pivoting movement of said second member (26) relative to said first member (14); and
   a locking device (36) associated with said steering column assembly (10) to selectively lock and unlock said steering column assembly (10) with respect to said tilting path (13) of adjustment, wherein said locking device (36) includes a lever arm (16) mounted to said steering column assembly (10) for rotation about a rotation axis (A) and a cam surface (80, 86, 88, 90, 92, 94), said locking device (36) also including a lock member (64) including a cam follower surface (82) engaged with said cam surface (80, 86, 88, 90, 92, 94) to move between locked and unlocked positions in response to said rotation, wherein said lock member (64) is spaced from said rotation axis (A) and spaced from said second rotational axis (C) along said longitudinal axis (11);

wherein said lock member (64) includes a pin (64) defining said cam follower surface (82) and a locking portion (76) selectively insertable in said slot (68) in response to said rotation of said lever arm (16) about said rotation axis (A).

2. The apparatus (8) of claim 1 wherein said lock member (64) is moveable along a linear path (B) spaced from rotation axis (A) in response to said rotation of said lever arm (16).

3. The apparatus (8) of claim 2 wherein said linear path (B) extends parallel to said rotation axis (A).

4. The apparatus (8) of claim 2 wherein said linear path (B) extends transverse to said longitudinal axis (11).

5. The apparatus (8) of claim 1 wherein said pin (64) further comprises:
a neck portion (78) disposed between said cam follower surface (82) and said locking portion (76) and sized smaller than said locking portion (76).

6. The apparatus (8) of claim 1 wherein said locking portion (76) is disposed in said bore (66) and said slot (68) when said lock member (64) is in said locked position and is spaced from said slot (68) when said lock member (64) is in said unlocked position.

7. The apparatus (8) of claim 1 wherein:
said locking portion (76) defines a first set of teeth; and
said slot (68) defines a second set of teeth (74, 76) wherein said first and second sets (74, 76) of teeth engage one another when said lock member (64) is in said locked position.

8. The apparatus (8) of claim 1 further comprising:
a second lock (38) engaged with said lever arm (16) and moveable between locked and unlocked positions to selectively lock said steering column assembly (10) with respect to a telescoping path (15) of adjustment in response to said rotation wherein said second lock (38) is spaced from said lock member (64) along said longitudinal axis (11).

9. The apparatus (8) of claim 8 wherein said second lock (38) is aligned with said rotation axis (A) with respect to said longitudinal axis (11).

10. The apparatus (8) of claim 8 wherein said steering column assembly (10) further comprises:
first and third members (14, 12) engaged with one another for sliding movement along said longitudinal axis (11), wherein said third member (12) defines a threaded bore (46) receiving said second lock (38).

11. The apparatus (8) of claim 10 wherein said lock further comprises:
a pin (44) having a threaded portion (60) engaged with said threaded bore (46) and a wedge (40) having a width and engaged with said threaded portion (60) for translation in response to rotation of said threaded portion (60).

12. The apparatus (8) of claim 11 further comprising:
a pocket (42) defined between said first and third members (14, 12) receiving said wedge (40).

13. The apparatus (8) of claim 12 wherein said first member (14) further comprises:
first and second stop surfaces (41, 141) defining sides of said pocket (42), wherein said first and second stop surfaces (41, 141) are spaced further from one another less than said width.

14. An apparatus (8) comprising:
a steering column assembly (10) defining a longitudinal axis (11) and adjustable along at least one of tilting and telescoping paths (13, 15) of adjustment, wherein said steering column assembly (10) includes first and second members (14, 26) pivotally engaged with one another about a second rotational axis (C) and also includes a third member (12) engaged with said first member (14) for relative sliding movement along said longitudinal axis (11);
a locking device (36) associated with said steering column assembly (10) to selectively lock and unlock steering column with respect to said at least one of tilting and telescoping paths (13, 15) of adjustment, wherein said locking device (36) includes a lever arm (16) mounted to said steering column assembly (10) for rotation about a rotation axis (A) and a cam surface (80, 86, 88, 90, 92, 94), said locking device (36) also including a lock member (64) including a cam follower surface (82) engaged with said cam surface (80, 86, 88, 90, 92, 94) to move between locked and unlocked positions in response to said rotation, wherein said lock member (64) is spaced from said rotation axis (A) along said longitudinal axis (11); and
a second lock (38) engaged with said lever arm (16) and moveable between locked and unlocked positions to selectively lock said steering column assembly (10) with respect to the other of said at least one of tilting and telescoping paths (13, 15) of adjustment in response to said rotation wherein said second lock (38) is spaced from said locking device (36) and aligned with said rotation axis (A) along said longitudinal axis (11).

15. An apparatus (8) as set forth in claim 14 wherein said second lock includes a telescoping lock (38) engaged having a wedge (40) moveable between locked and unlocked positions to selectively lock said steering column assembly (10) with respect to the telescoping path (15), wherein said wedge (40) prevents movement of said first and third members (14, 12) relative to one another when in said locked position and limits movement of said first and third members (14, 12) relative to one another when in said locked position.

16. The apparatus (8) of claim 15 wherein:
said first and third members (14, 12) cooperate to form a pocket (42) receiving said wedge (40).

17. The apparatus (8) of claim 16 wherein said pocket (48) is wider than said wedge (40).

18. The apparatus (8) of claim 17 wherein said wedge (40) is always at least partially in said pocket (42) to limit movement of said first member (14) along said telescoping path (15).

\* \* \* \* \*